(12) United States Patent
Yang et al.

(10) Patent No.: US 11,436,447 B2
(45) Date of Patent: Sep. 6, 2022

(54) TARGET DETECTION (71) Applicant: BEIJING BAIDU NETCOM SCIENCE AND TECHNOLOGY CO., LTD., Beijing (CN)

(72) Inventors: Yehui Yang, Beijing (CN); Lei Wang, Beijing (CN); Yanwu Xu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 156 days.

(21) Appl. No.: 17/039,554

(22) Filed: Sep. 30, 2020

(65) Prior Publication Data
US 2021/0406616 A1 Dec. 30, 2021

(30) Foreign Application Priority Data

Jun. 29, 2020 (CN) .......................... 202010611651.X (51) Int. Cl.
*G06K 9/62* (2022.01)
*G06N 3/08* (2006.01)
*G06V 40/18* (2022.01)

(52) U.S. Cl.
CPC ......... *G06K 9/6268* (2013.01); *G06K 9/6232* (2013.01); *G06N 3/08* (2013.01); *G06V 40/193* (2022.01); *G06V 40/197* (2022.01)

(58) Field of Classification Search
CPC .. G06K 9/6268; G06K 9/6232; G06K 9/6267; G06N 3/08; G06N 3/0454; G06N 20/00; G06V 40/193; G06V 40/197; G06V 10/462

USPC .......................................... 382/181
See application file for complete search history.

(56) References Cited

U.S. PATENT DOCUMENTS

| 7,813,561 | B2 * | 10/2010 | Jia .......................... G06F 16/583 382/227 |
| 8,675,974 | B2 * | 3/2014 | Iio .......................... G06K 9/6223 382/190 |
| 2012/0045095 | A1 * | 2/2012 | Tate .......................... G06T 7/75 382/103 |
| 2015/0186797 | A1 * | 7/2015 | Kumar .................. G06N 20/00 706/12 |

(Continued)

FOREIGN PATENT DOCUMENTS

| CN | 101520894 A | 9/2009 |
| CN | 104103082 A | 10/2014 |

(Continued)

*Primary Examiner* — Juan A Torres
(74) *Attorney, Agent, or Firm* — Seed IP Law Group LLP (57) ABSTRACT

A target detection method a is provided, which relates to the fields of deep learning, computer vision, and artificial intelligence. The method comprises: classifying, by using a first classification model, a plurality of image patches comprised in an input image, to obtain one or more candidate image patches, in the plurality of image patches, that are preliminarily classified as comprising a target; extracting a corresponding salience area for each candidate image patch; constructing a corresponding target feature vector for each candidate image patch based on the corresponding salience area for each candidate image patch; and classifying, by using a second classification model, the target feature vector to determine whether each candidate image patch comprises the target.

16 Claims, 5 Drawing Sheets

(56) References Cited

U.S. PATENT DOCUMENTS

| | | | | |
|---|---|---|---|---|
| 2016/0019440 A1* | 1/2016 | Shen | .................... | G06V 10/40 |
| | | | | 382/159 |
| 2016/0371538 A1* | 12/2016 | Shen | .................... | G06V 40/161 |
| 2020/0218888 A1* | 7/2020 | Gong | .................... | G06V 10/22 |
| 2021/0374453 A1* | 12/2021 | Kuo | ........................ | G06N 3/02 |
| 2021/0374477 A1* | 12/2021 | Kim | .................... | G06K 9/6259 |
| 2021/0383262 A1* | 12/2021 | Elen | .................... | G06T 7/0012 |

FOREIGN PATENT DOCUMENTS

| | | |
|---|---|---|
| CN | 104851102 A | 8/2015 |
| CN | 110782420 A | 2/2020 |

* cited by examiner

TARGET DETECTION

CROSS REFERENCE TO RELATED APPLICATION

This application claims priority to Chinese Patent Application No. 202010611651.X, filed on Jun. 29, 2020, the contents of which are hereby incorporated by reference in their entirety.

TECHNICAL FIELD

The present disclosure relates to the field of computer technologies, and more specifically, to the fields of deep learning, computer vision, and artificial intelligence.

BACKGROUND ART

In today's era of network popularization and image information explosion, it becomes increasingly difficult for humans to process external image information simply through their own visual perception system. Therefore, using computers to process image information has become popular.

Target detection methods play a vital role in image processing and related engineering, and have a wide range of applications, especially in military, medical, transportation, security, and other fields. However, detection of small target areas in a large field of view has always been a challenge in the field of target detection. Because small targets have few pixels and non-discriminative features, the small targets generally have lower sensitivity and/or accuracy than large targets.

SUMMARY OF THE INVENTION

According to one aspect of the present disclosure, a target detection method is provided. The method comprises: classifying, by using a first classification model, a plurality of image patches comprised in an input image, to obtain one or more candidate image patches, in the plurality of image patches, that are preliminarily classified as comprising a target; extracting a corresponding salience area for each candidate image patch; constructing a corresponding target feature vector for each candidate image patch based on the corresponding salience area for each candidate image patch; and classifying, by using a second classification model, the target feature vector to determine whether each candidate image patch comprises the target.

According to another aspect of the present disclosure, a target detection apparatus is provided, which comprises: a first classification module configured to classify, by using a first classification model, a plurality of image patches comprised in an input image, to obtain one or more candidate image patches, in the plurality of image patches, that are classified as comprising a target; an extraction unit configured to extract a corresponding salience area for each candidate image patch; a construction module configured to construct a corresponding target feature vector for each candidate image patch based on the corresponding salience area for each candidate image patch; and a second classification module configured to classify, by using a second classification model, the target feature vector to determine whether each candidate image patch comprises the target.

According to another aspect of the present disclosure, an electronic device is provided, which comprises: a processor; and a memory storing a program, the program including instructions that, when executed by the processor, cause the processor to perform the method according to the present disclosure.

According to another aspect of the present disclosure, a computer-readable storage medium storing a program is provided, the program including instructions that, when executed by a processor of an electronic device, cause the electronic device to perform the method according to the present disclosure.

According to the target detection method and apparatus, the electronic device, and the readable storage medium provided in the present disclosure, the target sensitivity and/or accuracy can be increased.

BRIEF DESCRIPTION OF THE DRAWINGS

Embodiments are shown exemplarily in the accompanying drawings and form a part of the specification together with a written description of the specification to explain the exemplary implementations of the embodiments. The embodiments shown are merely for illustrative purposes and do not limit the scope of the claims. Throughout the drawings, like reference signs denote like but not necessarily identical elements.

DETAILED DESCRIPTION OF EMBODIMENTS

Embodiments of the present disclosure will be described in more detail below with reference to the accompanying drawings. Although some embodiments of the present disclosure are shown in the accompanying drawings, it should be understood that the present disclosure can be implemented in various forms and should not be construed as being limited to the embodiments set forth herein. On the contrary, these embodiments are provided for a more thorough and complete understanding of the present disclosure. It should be understood that the accompanying drawings and the embodiments of the present disclosure are merely for exemplary purposes, and are not intended to limit the protection scope of the present disclosure.

It should be understood that the steps recorded in the method implementations of the present disclosure may be performed in different orders and/or in parallel. Furthermore, additional steps may be comprised and/or the execution of the illustrated steps may be omitted in the method implementations. The scope of the present disclosure is not limited in this respect.

In some target detection methods, in order to increase sensitivity for targets, especially small targets, candidate box sampling can be performed in a shallow feature map to better grasp the small targets. Because the receptive field is small at a node close to an input shallow feature map, more detailed information can be included.

According to some target detection methods, a sample size of small targets can also be expanded by amplification, so that an algorithm can learn small target features from a large number of samples to improve detection performance.

However, although the use of detection candidate boxes in the shallow feature map may increase recall for the small targets to some extent, and ensure that there is a relatively appropriate candidate box that may include the small targets, inherent characteristics of the small targets are not utilized. Therefore, whether a detection result including the small targets can be accurately found, e.g., from all candidate boxes, is still data-driven black-box determination.

Similarly, expanding the sample size by amplification to improve detection performance is also data-driven black-box determination, and the inherent characteristics of the small targets are not utilized either.

In addition, the resolution of an image to be detected can also be increased by using a method such as interpolation. In this case, the resolution of the small targets also naturally increases, which may make the small targets easier to detect.

However, expanding the image through interpolation increases the number of detection boxes, and accordingly, both memories occupied for running an algorithm and time cost increase. Moreover, it does not solve the problem that there is a too small proportion of small targets. In addition, increasing the resolution through interpolation may introduce some artificial details, which may then negatively affect the outcome of target detection in other ways, e.g., increasing false positive rate.

To at least further increase sensitivity, efficiently, and/or accuracy for detecting small targets, the present application proposes a target detection method. Some exemplary embodiments and implementations of the target detection method are described below with reference to the accompanying drawings.

Figure 1:
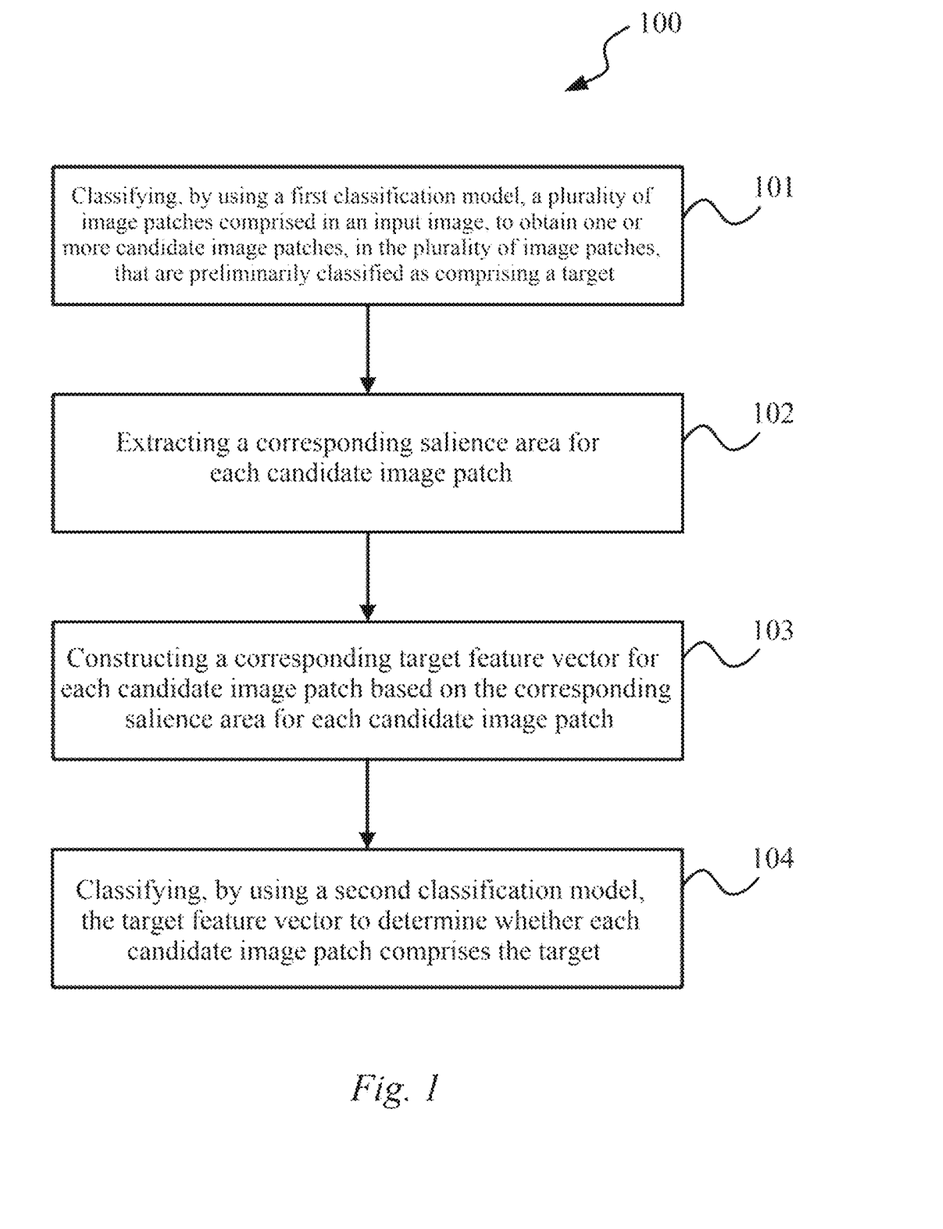
FIG. 1 is a flowchart showing a target detection method according to some embodiments of the present disclosure.

FIG. 1 is a flowchart 100 showing a target detection method according to some embodiments of the present disclosure.

As shown in FIG. 1: the target detection method comprises:

step 101: classifying, by using a first classification model, a plurality of image patches comprised in an input image, to obtain one or more candidate image patches, in the plurality of image patches, that are preliminarily classified as comprising a target;

step 102: extracting a corresponding salience area for each candidate image patch;

step 103: constructing a corresponding target feature vector for each candidate image patch based on the corresponding salience area for each candidate image patch; and step 104: classifying, by using a second classification model, the target feature vector to determine whether each candidate image patch comprises the target.

Based on the above target detection method, a preliminary classification result of the first classification model is utilized, and the target feature vector for the candidate image patch is constructed based on the salience area. Therefore, inherent characteristics of small targets can be utilized, and sensitivity and/or accuracy for the small targets can be increased.

Exemplary implementations of the steps of the target detection method according to the embodiments of the present disclosure are described below in detail with reference to the accompanying drawings.

In step 101, a plurality of image patches comprised in an input image are classified by using a first classification model, to obtain one or more candidate image patches, in the plurality of image patches, that are preliminarily classified as comprising a target.

Figure 2:
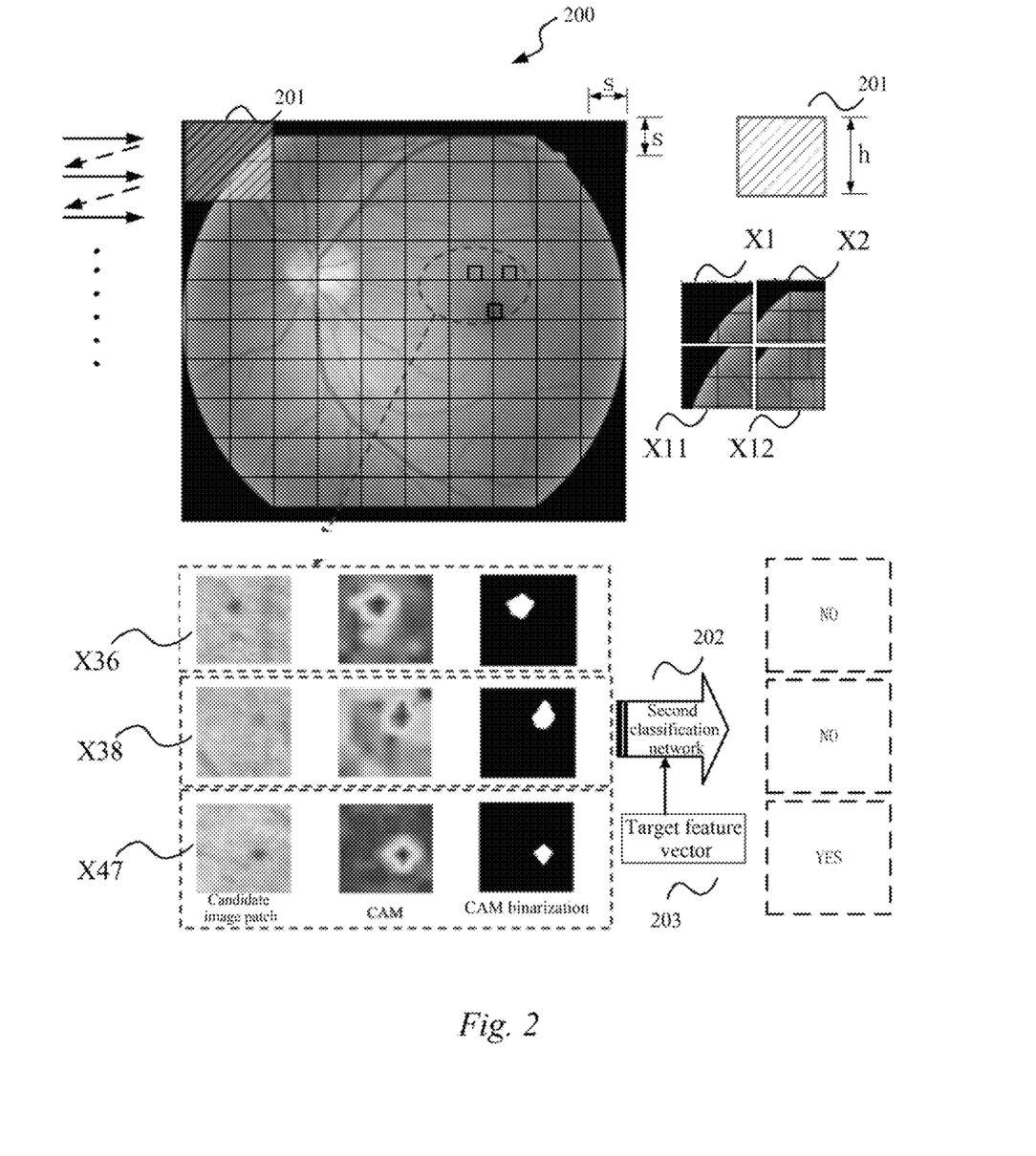
FIG. 2 is a schematic diagram showing a target detection method according to some embodiments of the present disclosure.

FIG. 2 is a schematic diagram 200 showing a target detection method according to some embodiments of the present disclosure. An exemplary method for acquiring the plurality of image patches comprised in the input image involved in step 101 will be described with reference to FIG. 2.

According to some implementations, the plurality of image patches comprised in the input image are obtained from the input image by using a sliding window. At least some of the plurality of image patches may overlap.

According to some implementations, before the plurality of image patches are classified by using the first classification model, all of the plurality of image patches are obtained by sliding the sliding window on the input image.

According to the example in FIG. 2, the input image is an eye fundus image, and a series of image patches $\{X_i\}=\{X_1, X_2, X_3, \ldots, X_m\}$ are obtained by sliding a sliding window 201 of a size h×h on the input image, wherein $X_1$, $X_2$, $X_3$, ..., $X_m$ are the acquired image patches, m represents the number of the acquired image patches, and $X_i$ represents an $i^{th}$ image patch. A sliding step of the sliding window is s, wherein s<h, and s may be 1. A sliding direction may be, for example, the direction of the broken line shown in FIG. 2: first sliding in the row direction for the step s, then moving down by the step s, and continuing to slide for the step s in the row after moving down, and so on, until the series of image patches are obtained. In the present disclosure, units of length, such as h and s, and corresponding units of area may be the number of pixels or any other units of length and units of area.

It can be understood that the sliding step and the sliding direction shown in FIG. 2 are both exemplary descriptions, and the present application is not limited thereto.

In the above description, the image patch $\{X_i\}$ is obtained in the manner of the sliding window, and in other embodiments, the image patch $\{X_i\}$ can also be obtained in the manner of an anchor.

Exemplarily, in the anchor manner, a sliding window slides on a feature map of a convolutional layer, a central point of the sliding window on the feature map corresponds to a central point in the input image, and several image patches with different areas and different aspect ratios are obtained from the input image by using the central point in the input image as the center.

Exemplarily, although in the above description, the sliding window is described as having a size of h×h, a sliding window on the feature map may alternatively correspond to several image patches with different areas and different aspect ratios in the input image. For example, the aspect ratios are 1:1, 1:2, and 2:1, respectively.

After the plurality of image patches $\{X_i\}$ are obtained, each of the plurality of image patches $\{X_i\}$ may be subsequently input to the first classification model for classification.

According to some exemplary implementations, the first classification model may, for example, comprise a deep machine learning network for classification, such as a deep neural network for classification (for example, a convolutional neural network, that is, a CNN network). The first classification network is not limited to any specific structure. For example, classical structures such as ResNet, VGGNet, and DenseNet can be used, and other self-built classification networks can also be used.

The target can be any target to be detected in the image. For example, the target may be a tumor focus, a pedestrian, a military target, an agricultural or forest region with special conditions, or other small or tiny targets to be detected.

According to some exemplary implementations, step 101 may comprise: outputting, by the first classification model, a corresponding probability that each of the plurality of image patches comprises the target; and determining an image patch with the probability greater than a predetermined threshold in the plurality of image patches as the candidate image patch.

According to some exemplary implementations, in step 101, the plurality of image patches comprised in the input image may be input to the first classification model, and the first classification model can output a corresponding confidence level of each image patch, the confidence level being a probability that the image patch comprises the target to be detected. The predetermined threshold may be set in advance (for example, an appropriate threshold can be set depending on a specific application), an image patch with a confidence level greater than the predetermined threshold is used as the candidate image patch that is preliminarily classified as comprising the target, and an image patch with a confidence level not greater than the predetermined threshold is classified as an image patch that does not comprise the target.

If the predetermined threshold is set to be relatively high, the probability that the candidate image patch comprises the target to be detected is not easily greater than the predetermined threshold. In this case, the accuracy of a classification result of the first classification model is relatively high, but a target (such as a tiny target) may be missed. If the predetermined threshold is set to be relatively low, the probability that the candidate image patch comprises the target to be detected is easily greater than the predetermined threshold. In this case, the recall (sensitivity) of a classification result of the first classification model is relatively high, but it also more easily causes false alarms.

Exemplarily, in order to prevent a target (such as a small target or a tiny target) from being missed, the predetermined threshold may be set to a relatively low value, such as 0.4 or 0.5. Although this may cause the first classification model to introduce more false alarms, in the present disclosure, candidate image patches as the false alarms in the first classification model can be further removed by using the second classification model, thereby ensuring the sensitivity for the targets (such as small targets and tiny targets).

According to some exemplary implementations, the first classification model may be trained in advance by using a plurality of sample image patches. For example, for each of the plurality of sample image patches, if it is determined manually or by other means that the sample image patch comprises the target (such as a small target or a tiny target), the label (that is, the set ground truth (ground truth) of the confidence level) of the sample image patch is set to 1; or if it is determined manually or by other means that the sample image patch does not comprise the target (such as a small target or a tiny target), the label of the sample image patch is set to 0. The first classification model is trained by using the plurality of sample image patches and their labels (the ground truth of the confidence level), so as to obtain a trained first classification model.

According to the example in FIG. 2, the image patch $\{X_i\}$ in the input eye fundus image is classified by using the first classification network, and three candidate image patches $X_{36}$, $X_{38}$ and $X_{47}$ that are preliminarily classified as comprising the target are obtained, that is, the three image patches are considered as comprising the target.

Next, step 102 is performed, in which a corresponding salience area for each candidate image patch is extracted.

Figure 3:
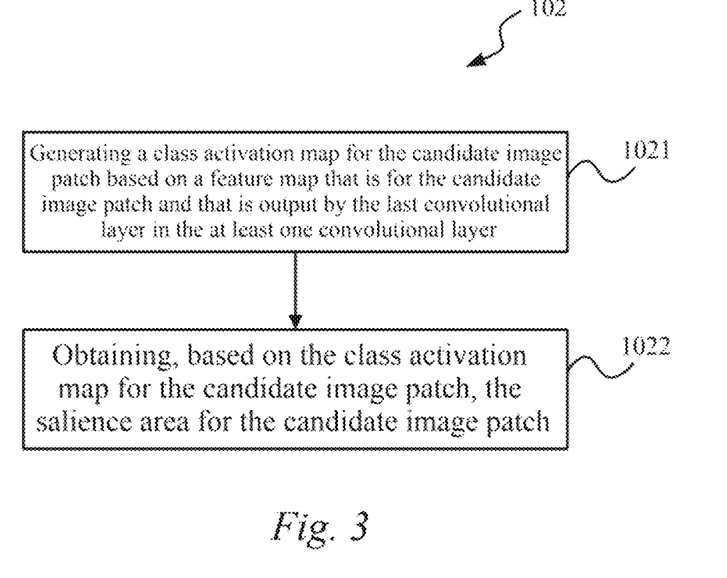
FIG. 3 is a flowchart showing some steps of a target detection method according to some embodiments of the present disclosure.

According to some exemplary implementations, the first classification model may comprise a deep neural network, and the deep neural network comprises an input layer, at least one convolutional layer, and at least one fully connected layer. FIG. 3 is a flowchart showing some steps of a target detection method according to some embodiments of the present disclosure. As shown in FIG. 3, step 102 may comprise: step 1021, generating a class activation map for the candidate image patch based on a feature map that is for the candidate image patch and that is output by the last convolutional layer in the at least one convolutional layer; and step 1022, obtaining, based on the class activation map for the candidate image patch, the salience area for the candidate image patch.

The feature map output by the last convolutional layer usually comprises information related to the target, and less information related to objects other than the target. Therefore, according to these exemplary implementations, because the salience area of the candidate image patch is obtained based on the feature map that is for the candidate image patch and that is output by the last convolutional layer, the salience area may comprise less information related to the objects other than the target, so that the target can be further detected based on the inherent characteristics of the target.

Figure 4:
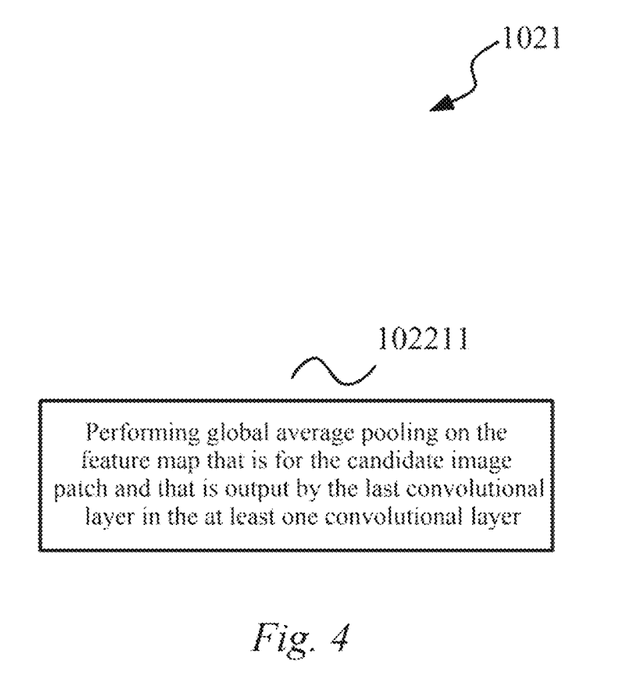
FIG. 4 is a flowchart showing some steps of a target detection method according to some embodiments of the present disclosure.

FIG. 4 is a flowchart showing some steps of a target detection method according to some embodiments of the present disclosure.

As shown in FIG. 4, according to some exemplary implementations, step 1021 may comprise: step 102211, generating the class activation map (CAM) for the candidate image patch by performing global average pooling on the feature map that is for the candidate image patch and that is output by the last convolutional layer in the at least one convolutional layer.

Figure 5:
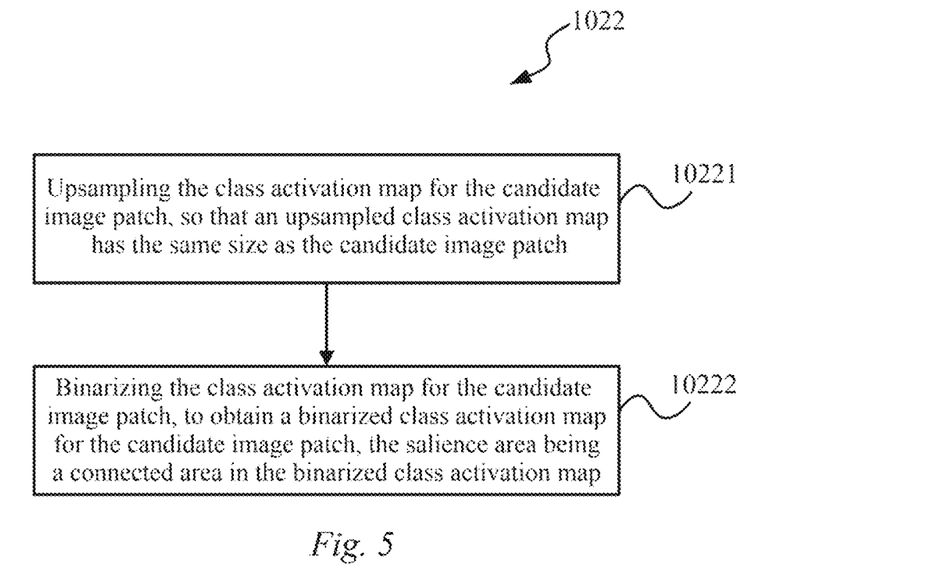
FIG. 5 is a flowchart showing some steps of a target detection method according to some embodiments of the present disclosure.

FIG. 5 is a flowchart showing some steps of a target detection method according to some embodiments of the present disclosure.

As shown in FIG. 5, according to some exemplary implementations, step 1022 may comprise: step 10222, binarizing the class activation map for the candidate image patch, to obtain a binarized class activation map for the candidate image patch, the salience area being a connected area in the binarized class activation map.

Exemplarily, as shown in FIG. 5, step 1022 may further comprise: step 10221, upsampling, before the binarizing is performed, the class activation map for the candidate image patch, so that an upsampled class activation map has the same size as the candidate image patch. According to this implementation, the binarizing in step 10222 is performed on the upsampled class activation map. It should be noted that upsampling is not a necessary step, and this upsampling step may not be performed.

Exemplarily, as shown in FIG. 2, for three corresponding feature maps that are for the candidate image patches $X_{36}$, $X_{38}$, and $X_{47}$ and that are output from the last convolutional layer in the first classification model, respective salience areas are respectively extracted from the three corresponding feature maps. The salience area for each candidate image patch can be, for example, obtained by using the class activation map ("CAM") or the (upsampled) binarized class activation map ("CAM binarization") shown in FIG. 2. For example, a connected image part (pixel) with a pixel value higher than a threshold in the CAM map may be used as the salience area. For example, a connected image part (pixel) representing a high pixel value (for example, the pixel value is "1" or is not "0") in the binarized CAM map may alternatively be used as the salience area.

Step 103 is continued to be performed, in which a corresponding target feature vector for each candidate image patch is constructed based on the corresponding salience area for each candidate image patch.

In the embodiment of the present application, at least some of the plurality of image patches may overlap, and step 103 may comprise: constructing, for each candidate image patch, the target feature vector for the candidate image patch in such a way that at least one of the following is comprised: a salience area proportion feature, representing a relative size of the connected area in the binarized class activation map for the candidate image patch; a salience area number feature, representing the number of connected areas in the binarized class activation map for the candidate image patch; a salience area hitting rate feature, representing the number of binarized class activation maps for the candidate image patch that comprise the connected area in the binarized class activation map for the candidate image patch at the same time; and a first classification model output feature, representing a probability that the candidate image patch comprises the target.

In the example of FIG. 2, the image patches $\{X_i\}$ may overlap each other. For example, as shown in FIG. 2, $X_1$, $X_2$, $X_{11}$, and $X_{12}$ overlap each other.

Exemplarily, at least some of the plurality of image patches $\{X_i\}$ overlap, so that in the process of acquiring the image patches, information at the boundaries of the image patches in the input image is not missed as much as possible. This helps an image patch in which the target to be detected is actually located to be preliminarily classified by the first classification model as a candidate image patch comprising the target.

Exemplarily, as shown in FIG. 2, for the salience area generated in step 102, corresponding target feature vectors 203 for the three candidate image patches $X_{36}$, $X_{38}$, and $X_{47}$ are constructed.

In the exemplary embodiment of the present application, target feature vectors based on visual salience are used for further classification, to detect tiny targets. According to some exemplary implementations, because the inherent characteristics of the small targets can be considered in the target feature vectors, and a priori features of the small targets in the candidate image patches are added, the detection performance for the small targets is improved.

Some exemplary implementations of construction of the target feature vector will be described below in detail in conjunction with the following.

Exemplarily, in step 103, said constructing a corresponding target feature vector for each candidate image patch may specifically comprise: for each candidate image patch, such as the three candidate image patches $X_{36}$, $X_{38}$, and $X_{47}$ shown in FIG. 2, corresponding target feature vectors 203 for the three candidate image patches $X_{36}$, $X_{38}$, and $X_{47}$ are constructed in such a way that at least one of the following is comprised: a salience area proportion feature; a salience area number feature; a salience area hitting rate feature; and a first classification model output feature.

According to some exemplary implementations, for a $j^{th}$ candidate image patch, the above-mentioned salience area proportion feature may be, for example, expressed as:

$$ar_j = 1 - \frac{\text{salience area}}{\text{patch area}}$$

wherein salience area $= \Sigma_{k=1}^{h} \Sigma_{l=1}^{h} v_{kl}$, $v_{kl}$ is a pixel value of a pixel in a $k^{th}$ row and an $l^{th}$ column in a binarized class activation map for the candidate image patch, the candidate image patch is an h×h image patch, and patch area $= h^2$ is the area of the candidate image patch.

Exemplarily, for the candidate image patches $X_{36}$, $X_{38}$, and $X_{47}$, the salience area proportion features are respectively expressed as:

$$ar_1 = 1 - \frac{\sum_{k=1}^{h} \sum_{l=1}^{h} v_{kl}}{h^2}$$

$$ar_2 = 1 - \frac{\sum_{k=1}^{h} \sum_{l=1}^{h} v_{kl}}{h^2}$$

$$ar_3 = 1 - \frac{\sum_{k=1}^{h} \sum_{l=1}^{h} v_{kl}}{h^2}$$

wherein each $v_{kl}$ is a pixel value of a pixel in a $k^{th}$ row and an $l^{th}$ column in a binarized class activation map for each of the candidate image patches $X_{36}$, $X_{38}$, and $X_{47}$.

As described above, the binarized class activation maps for the candidate image patches $X_{36}$, $X_{38}$, and $X_{47}$ may be, for example, the binarized CAM maps in FIG. 2.

For the binarized CAM map for each candidate image patch, the area (the number of pixels) salience area of a salience area therein is calculated by using the formula $\Sigma_{k=1}^{h} \Sigma_{l=1}^{h} v_{kl}$, patch area $= h^2$ being the area (the number of pixels) of the candidate image patch, and therefore, in this feature, $$\frac{\text{salience area}}{\text{patch area}}$$

is the ratio of the area (the number of pixels) of the salience area to the area (the number of pixels) of the image patch.

In the example shown in FIG. 2, a binarized class activation map for any one of the candidate image patches may comprise h×h pixels, for example. For example, the size of the binarized class activation map for the candidate image patch can be made equal to the size of the candidate image patch in the input image, for example, by increasing the number of pixels through interpolation, or by decreasing the number of pixels through an average pooling operation. Although the area (the number of pixels) of the binarized class activation map for the candidate image patch in this example is the same as the area (the number of pixels) of the candidate image patch in the input image, the area (the number of pixels) of the binarized class activation map for the candidate image patch may also be different from the area (the number of pixels) of the candidate image patch in the input image.

Exemplarily, during detection of small targets, especially tiny targets, the smaller the value of the ratio (hence the larger the obtained salience area proportion feature), the higher the possibility that the target is comprised in the area.

According to some exemplary implementations, for a $j^{th}$ candidate image patch, the above-mentioned salience area number feature may be, for example, expressed as:

$$sn_j = 1 - \frac{1}{\text{salience number}},$$

wherein salience number is the number of connected areas (salience areas) in a binarized class activation map for the candidate image patch.

Exemplarily, the larger the number (hence the larger the obtained salience area number feature), the higher the possibility that the target is comprised in the area, wherein the connected area can be extracted by using the Opencv algorithm.

Figure 6:
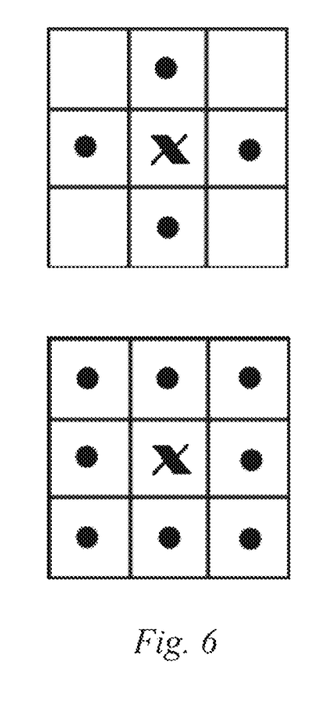
FIG. 6 is a schematic diagram showing a pixel adjacency relationship according to some embodiments of the present disclosure.

Exemplarily, the meaning of the connected area is explained in conjunction with FIG. 6, and FIG. 6 is a schematic diagram showing a pixel adjacency relationship according to some embodiments of the present disclosure.

As shown in FIG. 6, in a binarized class activation map, the smallest unit is a pixel, and each pixel has eight adjacent pixels around. There are two common adjacency relationships: 4-adjacency and 8-adjacency.

As shown in the upper figure in FIG. 6, the 4-adjacency means that the central pixel is adjacent to the four points at the upper, lower, left, and right of the central pixel, respectively. As shown in the lower figure in FIG. 6, the 8-adjacency further comprises diagonal points, that is, the central pixel is adjacent to the eight points at the upper, lower, left, right, upper left, lower left, upper right, and lower right of the central pixel, respectively.

Exemplarily, if a pixel A is adjacent to a pixel B, then A and B are connected, and if A and B are connected, and B and C are connected, then A and C are connected.

Visually, the connected points form an area, while the points that are not connected form different areas. Such a set of connected points of all points is called a connected area.

In the embodiment of the present application, both the 4-adjacency method and the 8-adjacency method may be used to determine the connected area. In the example of FIG. 2, the candidate image patches $X_{36}$, $X_{38}$, and $X_{47}$ each have only one connected area, and therefore in this example, the value of a corresponding salience area number feature of each candidate image patch is 0.

According to some exemplary implementations, for a $j^{th}$ candidate image patch, the above-mentioned salience area hitting rate feature is expressed as:

$$ht_j = 1 - \frac{1}{\text{hitting times}},$$

wherein hitting times is the total number of all binarized class activation maps for the candidate image patch that comprise connected areas (salience areas) in a binarized class activation map for the candidate image patch.

Exemplarily, hitting times is the number of image patches comprising the salience area of the image patch when the salience area is detected by binarized class activation maps for other image patches at the same time. Exemplarily, the salience area comprises the connected area in the binarized class activation map for the candidate image patch.

Exemplarily, because the image patches are obtained by using a sliding window, and the size of the sliding window is larger than the sliding step, some of the image patches overlap. Therefore, if a salience area is comprised by the binarized class activation maps for a plurality of image patches at the same time, it indicates that the salience area is more likely to comprise the hitting times of a target object.

Exemplarily, if a binarized class activation map for a candidate image patch comprises only one connected area (salience area), and the connected area is not comprised in other candidate image patches, that is, the connected area is comprised in a total of one candidate image patch, the hitting times is 1, and therefore the value of the salience area hitting rate feature is 0. If a binarized class activation map for a candidate image patch comprises two connected areas (salience areas), wherein the first connected area is also comprised in another candidate image patch (that is, the connected area is comprised in a total of two candidate image patches), and the second connected area is also comprised in other two candidate image patches (that is, the connected area is comprised in a total of three candidate image patches), then the hitting times is 2+3=5, and the value of the salience area hitting rate feature is 1−⅕=⅘.

According to some exemplary implementations, for a $j^{th}$ candidate image patch, the first classification model output feature is expressed as $p_j$, wherein $p_j$ represents a probability (for example, the confidence level described above), determined by the first classification model, that the candidate image patch comprises the target.

Although the four specific target features used to construct the target feature vector are described above, it should be understood that the target features available in the present disclosure are not limited to the above four specific target features. Any other feature can be used to construct the target feature vector. Alternatively, the target feature vector may not comprise all of the above four specific target features.

For a candidate image patch, after the target features are obtained, for example, the target features can be spliced to obtain the target feature vector.

Step 104 is continued to be performed, in which the target feature vector is classified by using a second classification model, to determine whether each candidate image patch comprises the target.

For example, the second classification model may be a classical network model, such as a support vector machine, GBDT, a Bayes classifier, etc. Alternatively, the second classification model may be a deep learning network, such as a deep neural network.

The second classification model used to classify the target feature vector may be a trained second classification model. Before the target feature vector for the candidate image patch is classified by using the second classification model, the above-mentioned sample feature vector may be calculated for the above-mentioned sample image patch with a label (that is, ground truth (ground truth) of a confidence level, which is set to 0 if the target is not comprised, or set to 1 if the target is comprised), and the above-mentioned sample feature vector for the sample image with the label is used to train the second classification model. The target feature vector for the candidate image patch can be classified by using the trained second classification model.

Exemplarily, as shown in FIG. 2, the target feature vectors 203 are classified by using the second classification model 202, so as to obtain a classification result indicating whether each of the three candidate image patches $X_{36}$, $X_{38}$, and $X_{47}$ comprises the target.

In the example of the eye fundus picture described in FIG. 2, the second classification network can output a classification result indicating whether the three candidate image patches $X_{36}$, $X_{38}$, and $X_{47}$ comprise microaneurysm as the target. For example, after classification by the second classification model 202, it is determined through analysis that the candidate image patches $X_{36}$ and $X_{38}$ do not comprise the microaneurysm, and the image patch $X_{47}$ comprises the microaneurysm.

Through the above two-level classification by the first classification model and the second classification model, the sensitivity for targets (such as small targets or tiny targets) can be increased.

According to some exemplary implementations, the detection method may further comprise: performing non-maximum suppression (NMS) on a candidate image patch that is determined by the second classification model as comprising the target, to obtain a detection result of all targets comprised in the input image.

Exemplarily, in non-maximum suppression, elements that are not maximum values are suppressed, so as to search for local maximum values.

When a plurality of candidate image patches that may be the target are found from a picture, a candidate image patch with the highest probability is selected from the plurality of candidate image patches, so as to avoid overlapping candidate image patches in a finally output classification result.

Figure 7:
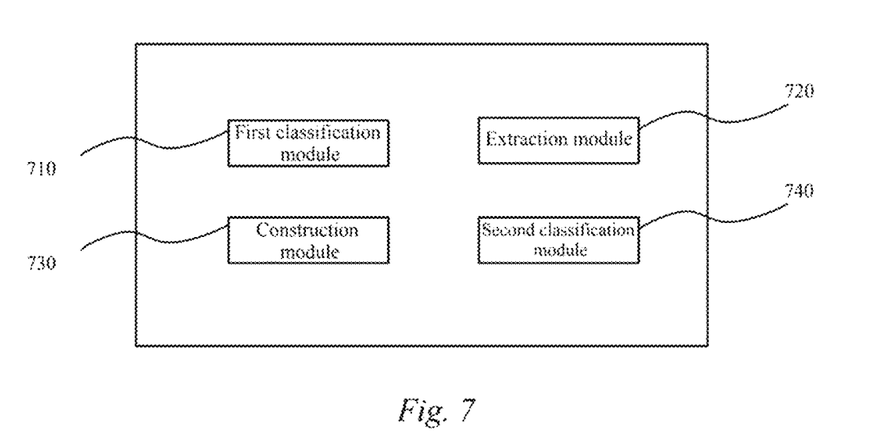
FIG. 7 is a schematic structural diagram showing a target detection apparatus according to some embodiments of the present disclosure.

Corresponding to the target detection methods provided in the foregoing several embodiments, an embodiment of the present application further provides a target detection apparatus. Because the target detection apparatus provided in the embodiment of the present application corresponds to the target detection methods provided in the foregoing several embodiments, the implementations of the foregoing target detection method are also applicable to the target detection apparatus provided in this embodiment, and will not be described in detail in this embodiment. FIG. 7 is a schematic structural diagram of a target detection apparatus according to some embodiments of the present disclosure. As shown in FIG. 7, the target detection apparatus 700 may comprise: a first classification module 710, an extraction module 720, a construction module 730, and a second classification module 740. Specifically, the apparatus comprises:

the first classification module 710 configured to classify, by using a first classification model, a plurality of image patches comprised in an input image, to obtain one or more candidate image patches, in the plurality of image patches, that are preliminarily classified as comprising a target;

the extraction unit 720 configured to extract a corresponding salience area for each candidate image patch;

the construction module 730 configured to construct a corresponding target feature vector for each candidate image patch based on the corresponding salience area for each candidate image patch; and the second classification module 740 configured to classify, by using a second classification model, the target feature vector to determine whether each candidate image patch comprises the target.

Based on the target detection apparatus, sensitivity for small targets and tiny targets can be increased.

In the embodiment of the present application, the first classification model may comprise, for example, a deep neural network, and the deep neural network may comprise, for example, an input layer, at least one convolutional layer, and at least one fully connected layer; and the extracting a corresponding salience area for each candidate image patch may comprise, for example: generating a class activation map for the candidate image patch based on a feature map that is for the candidate image patch and that is output by the last convolutional layer in the at least one convolutional layer; and obtaining, based on the class activation map for the candidate image patch, the salience area for the candidate image patch.

Exemplarily, the first classification model comprises the deep neural network, and the deep neural network includes the input layer, the at least one convolutional layer, and the fully connected layer. For the method for extracting the salience area, reference may be made to the salience area extraction method in the foregoing target detection method. Details are not repeated herein.

In the embodiment of the present application, at least some of the plurality of image patches may overlap, and the construction module may comprise, for example:

a module that, for example, constructs, for each candidate image patch, the target feature vector for the candidate image patch in such a way that at least one of the following is comprised:

a salience area proportion feature, representing a relative size of the connected area in the binarized class activation map for the candidate image patch;

a salience area number feature, representing the number of connected areas in the binarized class activation map for the candidate image patch;

a salience area hitting rate feature, representing the number of binarized class activation maps for the candidate image patch that comprise the connected area in the binarized class activation map for the candidate image patch at the same time; and a first classification model output feature, representing a probability that the candidate image patch comprises the target.

Exemplarily, for the salience area proportion feature, the salience area number feature, the salience area hitting rate feature, and the first classification model output feature, reference may be made to the construction of the target feature vector in the foregoing target detection method. Details are not repeated herein.

In the embodiment of the present application, the plurality of image patches may be obtained from the input image, for example, by using a sliding window, and at least some of the plurality of image patches overlap.

Exemplarily, for the method for generating a plurality of image patches, refer to the method for generating image patches in the foregoing target detection method. Details are not repeated herein.

According to an embodiment of the present application, the present application further provides an electronic device and a readable storage medium.

Figure 8:
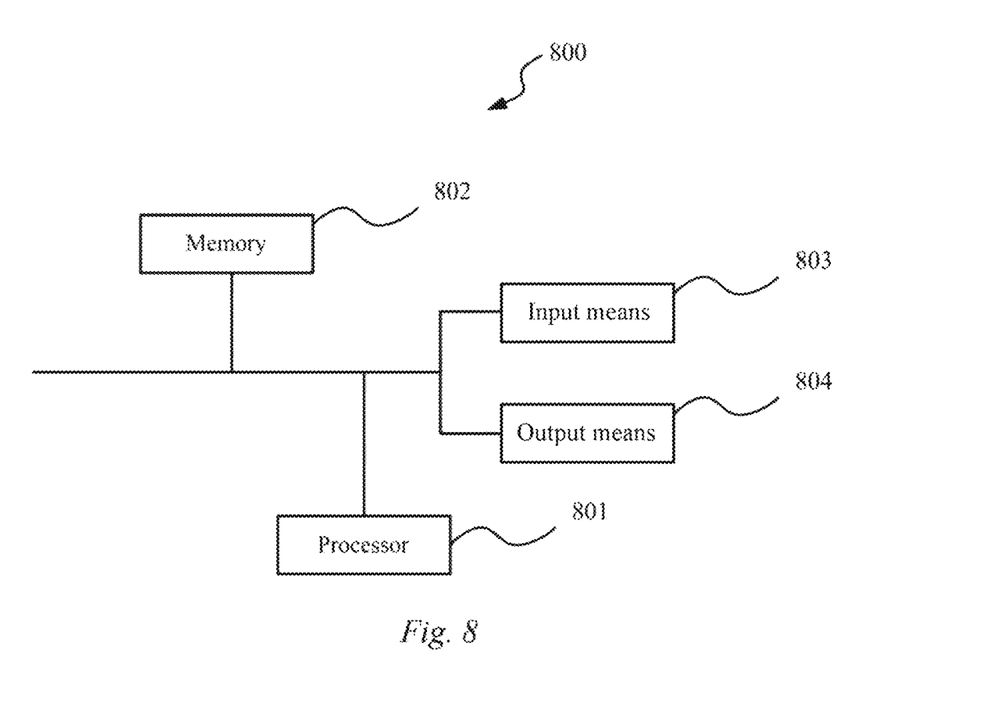
FIG. 8 is a structural block diagram showing an exemplary electronic device that can be applied to some embodiments of the present disclosure.

FIG. 8 is a structural block diagram showing an exemplary electronic device that can be applied to some embodiments of the present disclosure.

The electronic device is intended to represent various forms of digital computers, such as a laptop computer, a desktop computer, a workstation, a personal digital assistant, a server, a blade server, a mainframe computer, and another suitable computer. The electronic device may also represent various forms of mobile devices, such as a personal digital assistant, a cellular phone, a smartphone, a wearable device, and another similar computing apparatus. The components shown herein, connections and relationships, and functions thereof are merely examples, and are not intended to limit the implementation of the present application described and/or required herein.

As shown in FIG. 8, the electronic apparatus 800 comprises: one or more processors 801, a memory 802, and interfaces for connecting various components, including a high-speed interface and a low-speed interface. The various components are connected to each other by using different buses, and may be installed on a common motherboard or installed in other manners as required. The processor may process instructions executed in the electronic device, including instructions stored in or on the memory to display graphical information of the GUI on an external input/input means (such as a display device coupled to an interface). In other implementations, if required, the plurality of processors and/or a plurality of buses can be used together with a plurality of memories. Similarly, a plurality of electronic devices can be connected, and each device provides some of the necessary operations (for example, as a server array, a group of blade servers, or a multi-processor system). One processor 801 is taken as an example in FIG. 8.

The memory 802 is a non-transitory computer-readable storage medium provided in the present application. The memory stores instructions executable by the at least one processor, so that the at least one processor performs the target detection method provided in the present application. The non-transitory computer-readable storage medium of the present application stores computer instructions, and the computer instructions are used to cause a computer to perform the target detection method provided in the present application.

As a non-transitory computer-readable storage medium, the memory 802 can be used to store a non-transitory software program, and a non-transitory computer-executable program and module, such as program instructions/modules (for example, the first classification module 710, the extraction module 720, the construction module 730, and the second classification module 740 shown in FIG. 7) corresponding to the target detection method in the embodiments of the present application. The processor 801 executes various functional applications and data processing of the server, that is, implements the target detection method in the foregoing method embodiments, by running non-transitory software programs, instructions, and modules stored in the memory 802.

The memory 802 may comprise a program storage area and a data storage area. The program storage area may store an application program required by an operating system and at least one function. The data storage area may store data created for the use of the electronic device for implementing the target detection method. In addition, the memory 802 may comprise a high-speed random access memory, and may further comprise a non-transitory memory, such as at least one magnetic disk storage device, a flash memory device, or other non-transitory solid-state storage devices. In some embodiments, the memory 802 may optionally comprise memories disposed remotely relative to the processor 801, and these remote memories may be connected, through a network, to the electronic device for implementing the target detection method. Instances of the above network include, but are not limited to, the Internet, an enterprise intranet, a local area network, a mobile communications network, and a combination thereof.

The electronic apparatus 800 for implementing the target detection method may further comprise: an input means 803 and an input means 804. The processor 801, the memory 802, the input means 803, and the input means 804 may be connected by a bus or in other manners. In FIG. 7, the connection using a bus is taken as an example.

The input means 803 can receive entered digit or character information, and generate a key signal input related to user settings and function control of the electronic device for implementing the target detection method, and may be input means such as a touchscreen, a keypad, a mouse, a trackpad, a touchpad, an indicator rod, one or more mouse buttons, a trackball, and a joystick. The input means 804 may include a display device, an auxiliary lighting apparatus (for example, an LED), a tactile feedback apparatus (for example, a vibration motor), etc. The display device may include, but is not limited to, a liquid crystal display (LCD), a light-emitting diode (LED) display, and a plasma display. In some implementations, the display device may be a touchscreen.

Various implementations of the systems and technologies described herein may be implemented in a digital electronic circuit system, an integrated circuit system, an ASIC (application-specific integrated circuit), computer hardware, firmware, software, and/or combinations thereof. The various embodiments may include: being implemented in one or more computer programs, the one or more computer programs may be executed and/or interpreted on a programmable system including at least one programmable processor, and the programmable processor may be a dedicated or general-purpose programmable processor that can receive data and instructions from a storage system, at least one input means, and at least one input means, and transmit the data and instructions to the storage system, the at least one input means, and the at least one input means.

These computing programs (also referred to as programs, software, software applications, or code) include machine instructions of the programmable processor, and these computing programs can be implemented by using an advanced procedure and/or object-oriented programming languages, and/or assembly/machine language. As used herein, the terms "machine-readable medium" and "computer-readable medium" refer to any computer program product, device, and/or apparatus (for example, a magnetic disk, an optical disc, a memory, a programmable logic device (PLD)) used to provide machine instructions and/or data to a programmable processor, and include a machine-readable medium that receives machine instructions as machine-readable signals. The term "machine-readable signal" refers to any signal used to provide machine instructions and/or data to the programmable processor.

In order to provide interaction with the user, the systems and technologies described herein can be implemented on a computer, which has: a display device (for example, a CRT (cathode-ray tube) or a LCD (liquid crystal display) monitor) for displaying information to the user; and a keyboard and a pointing apparatus (for example, a mouse or a trackball) through which the user can provide an input to the computer. Other types of apparatuses can further be used to provide interaction with the user. For example, feedback provided to the user can be any form of sensory feedback (for example, visual feedback, auditory feedback, or tactile feedback); and an input from the user can be received in any form (including an acoustic input, voice input, or tactile input).

The systems and technologies described herein can be implemented in a computing system that comprises a back-end component (for example, as a data server), or a computing system that comprises a middleware component (for example, an application server), or a computing system that comprises a front-end component (for example, a user computer with a graphical user interface or a web browser, through which the user can interact with the implementations of the systems and technologies described herein), or a computing system that comprises any combination of the back-end component, the middleware component, or the front-end component. The components of the system can be connected to each other through any form or medium of digital data communication (for example, a communications network). Examples of the communications network include: a local area network (LAN), a wide area network (WAN), and the Internet.

The computer system can comprise a client and a server. The client and the server are generally far away from each other and usually interact with each other through the communications network. A relationship between the client and the server is generated by computer programs that run on respective computers and have a client-server relationship with each other.

It should be understood that the steps may be reordered, added, or deleted by using the various forms of procedures shown above. For example, the steps described in the present application can be performed in parallel, sequentially, or in a different order, provided that the desired result of the technical solutions disclosed in the present application can be achieved, this is not limited herein.

The foregoing embodiments do not constitute a limitation on the protection scope of the present application. Those skilled in the art should be aware that various modifications, combinations, sub-combinations, and replacements can be made according to design requirements and other factors. Any modifications, equivalent replacements and improvements made within the spirit and principles of the present application shall fall within the protection scope of the present application.

The invention claimed is:

1. A target detection method, comprising:
classifying, using at least a first classification model, a plurality of image patches included in an input image, to obtain one or more candidate image patches, in the plurality of image patches, that are preliminarily classified as including a target; and
for each candidate image patch:
extracting a corresponding salience area;
constructing a corresponding target feature vector based, at least in part, on the corresponding salience area; and
classifying, using at least a second classification model, the corresponding target feature vector to determine whether the candidate image patch includes the target.

2. The method according to claim 1,
wherein the first classification model includes a deep neural network, and the deep neural network includes an input layer, at least one convolutional layer, and at least one fully connected layer, and
wherein extracting a corresponding salience area comprises:
generating a class activation map for the candidate image patch based, at least in part, on a feature map that is for the candidate image patch and that is output by the last convolutional layer in the at least one convolutional layer; and
obtaining, based, at least in part, on the class activation map for the candidate image patch, the corresponding salience area for the candidate image patch.

3. The method according to claim 2,
wherein obtaining, based, at least in part, on the class activation map for the candidate image patch, the corresponding salience area for the candidate image patch comprises:
binarizing the class activation map for the candidate image patch, to obtain a binarized class activation map for the candidate image patch, the corresponding salience area being a connected area in the binarized class activation map.

4. The method according to claim 3,
wherein obtaining, based, at least in part, on the class activation map for the candidate image patch, the corresponding salience area for the candidate image patch further comprises:
upsampling, before the binarizing is performed, the class activation map for the candidate image patch, so that an upsampled class activation map has the same size as the candidate image patch,
wherein the binarizing is performed on the upsampled class activation map.

5. The method according to claim 2, wherein generating a class activation map for the candidate image patch based, at least in part, on a feature map that is for the candidate image patch and that is output by the last convolutional layer in the at least one convolutional layer comprises:
generating the class activation map for the candidate image patch by performing global average pooling on the feature map that is for the candidate image patch and that is output by the last convolutional layer in the at least one convolutional layer.

6. The method according to claim 3,
wherein at least some of the plurality of image patches overlap, and
wherein constructing a corresponding target feature vector comprises:
constructing the corresponding target feature vector to include at least one of:
a salience area proportion feature, representing a relative size of the connected area in the binarized class activation map for the candidate image patch;
a salience area number feature, representing the number of connected areas in the binarized class activation map for the candidate image patch;
a salience area hitting rate feature, representing the number of binarized class activation maps for the candidate image patch that include the connected area in the binarized class activation map for the candidate image patch at the same time; and
a first classification model output feature, representing a probability that the candidate image patch includes the target.

7. The method according to claim 6, wherein for a $j^{th}$ candidate image patch, the salience area proportion feature is expressed as:

$$ar_j = 1 - \frac{\text{salience area}}{\text{patch area}},$$

wherein salience area=$\sum_{k=1}^{h}\sum_{l=1}^{h} v_{kl}$, $v_{kl}$ is a pixel value of a pixel in a $k^{th}$ row and an $l^{th}$ column in a binarized class activation map for the candidate image patch, the candidate image patch is an h×h image patch, and patch area=$h^2$ is the area of the candidate image patch.

8. The method according to claim 6, wherein for a $j^{th}$ candidate image patch, the salience area number feature is expressed as:

$$sn_j = 1 - \frac{1}{\text{salience number}},$$

wherein salience number is the number of connected areas in a binarized class activation map for the candidate image patch.

9. The method according to claim 6, wherein for a $j^{th}$ candidate image patch, the salience area hitting rate feature is expressed as:

$$ht_j = 1 - \frac{1}{\text{hitting times}},$$

wherein hitting times is the total number of all binarized class activation maps for the candidate image patch that include connected areas in a binarized class activation map for the candidate image patch.

10. The method according to claim 6, wherein for a $j^{th}$ candidate image patch, the first classification model output feature is expressed as $p_j$, wherein $p_j$ represents a probability that the candidate image patch includes the target.

11. The method according to claim 1, wherein classifying, using at least a first classification model, a plurality of image patches included in an input image, to obtain one or more candidate image patches, in the plurality of image patches, that are preliminarily classified as including a target comprises:
 for each of the plurality of image patches, outputting, by the first classification model, a corresponding probability that the image patch includes the target; and
 determining an image patch, in the plurality of image patches, with its corresponding probability greater than a threshold, as one of the one or more candidate image patches.

12. The method according to claim 1, wherein the plurality of image patches are obtained from the input image by using a sliding window, and at least some of the plurality of image patches overlap.

13. The method according to claim 12, wherein before the plurality of image patches are classified using at least the first classification model, all of the plurality of image patches are obtained by sliding the sliding window on the input image.

14. The method according to claim 1, further comprising:
 performing non-maximum suppression on a candidate image patch that is determined using at least the second classification model as including the target, to obtain a detection result of all targets included in the input image.

15. A computing device, comprising:
 one or more processors; and
 a memory having instructions stored thereon, wherein the instructions, when executed by the one or more processors, cause the one or more processors to perform actions comprising:
  classifying, using at least a first classification model, a plurality of image patches included in an input image, to obtain one or more candidate image patches, in the plurality of image patches, that are preliminarily classified as including a target; and
  for each candidate image patch:
   extracting a corresponding salience area;
   constructing a corresponding target feature vector based, at least in part, on the corresponding salience area; and
   classifying, using at least a second classification model, the corresponding target feature vector to determine whether the candidate image patch includes the target.

16. A non-transitory computer-readable storage medium having instructions stored thereon, wherein the instructions, when executed by one or more processors, cause the one or more processors to perform a method comprising:
 classifying, using at least a first classification model, a plurality of image patches included in an input image, to obtain one or more candidate image patches, in the plurality of image patches, that are preliminarily classified as including a target; and
 for each candidate image patch:
  extracting a corresponding salience area;
  constructing a corresponding target feature vector based, at least in part, on the corresponding salience area; and
  classifying, using at least a second classification model, the corresponding target feature vector to determine whether the candidate image patch includes the target.

* * * * *

UNITED STATES PATENT AND TRADEMARK OFFICE
CERTIFICATE OF CORRECTION

| | | |
|---|---|---|
| PATENT NO. | : 11,436,447 B2 | Page 1 of 1 |
| APPLICATION NO. | : 17/039554 | |
| DATED | : September 6, 2022 | |
| INVENTOR(S) | : Yehui Yang et al. | |

It is certified that error appears in the above-identified patent and that said Letters Patent is hereby corrected as shown below:

On the Title Page

Item [57], Line 1:
"method a is provided,"
Should read:
--method is provided,--.

Signed and Sealed this
Seventeenth Day of September, 2024

Katherine Kelly Vidal
*Director of the United States Patent and Trademark Office*